US012665467B2

(12) United States Patent (10) Patent No.: US 12,665,467 B2
Uchidate et al. (45) Date of Patent: Jun. 23, 2026

(54) MOTOR WITH BUSBAR TERMINAL WITH OVERLAPPING LAYERS WITH EXTERNAL CONNECTION TERMINAL, COIL TERMINAL AND COIL TERMINAL PART

(71) Applicant: MITSUBA Corporation, Gunma (JP)

(72) Inventors: Takahiro Uchidate, Gunma (JP); Katsumasa Fukasawa, Gunma (JP); Takenori Fukushima, Gunma (JP); Satoshi Kibe, Gunma (JP)

(73) Assignee: MITSUBA Corporation, Gunma (JP)

( * ) Notice: Subject to any disclaimer, the term of this patent is extended or adjusted under 35 U.S.C. 154(b) by 215 days.

(21) Appl. No.: 18/634,986

(22) Filed: Apr. 14, 2024

(65) Prior Publication Data

US 2025/0047165 A1 Feb. 6, 2025

(30) Foreign Application Priority Data

Aug. 4, 2023 (JP) ................................. 2023-128130

(51) Int. Cl.
H02K 5/22 (2006.01)
(52) U.S. Cl.
CPC ......... H02K 5/225 (2013.01); H02K 2203/09 (2013.01)
(58) Field of Classification Search
CPC ............ H02K 3/50; H02K 3/505; H02K 3/52; H02K 3/521; H02K 3/522; H02K 3/524; H02K 3/525; H02K 3/46; H02K 3/28; H02K 3/18; H02K 1/146; H02K 1/2706; H02K 5/225; H02K 2203/09
USPC .......................................... 310/71, 180–208
See application file for complete search history.

(56) References Cited

U.S. PATENT DOCUMENTS

| | | | | |
|---|---|---|---|---|
| 2,871,285 A | * | 1/1959 | Fouse ...................... | H02G 5/06 174/88 B |
| 2,977,449 A | * | 3/1961 | Roethlisberger ......... | H02G 5/08 361/675 |
| 4,420,701 A | * | 12/1983 | Nikitin ..................... | H02K 3/47 310/71 |
| 4,590,397 A | * | 5/1986 | Davis ..................... | H02K 5/225 310/43 |
| 4,689,546 A | * | 8/1987 | Stephens ................ | H02K 5/225 310/71 |
| 4,799,309 A | * | 1/1989 | Cinzori ................. | H10W 90/00 257/E25.026 |
| 4,896,062 A | * | 1/1990 | Pollard ................. | H10W 90/00 363/145 |
| 5,517,063 A | * | 5/1996 | Schantz, Jr. .............. | B60L 3/00 363/71 |
| 5,559,385 A | * | 9/1996 | Yalovega ................. | H02K 3/28 310/198 |
| 5,573,414 A | * | 11/1996 | Taillon ................... | H02K 3/505 29/889.22 |

(Continued)

FOREIGN PATENT DOCUMENTS

JP 2021052492 4/2021

*Primary Examiner* — Maged M Almawri
(74) *Attorney, Agent, or Firm* — JCIPRNET

(57) ABSTRACT

A motor includes a busbar terminal including a plurality of layers overlapping in an axial direction. In the busbar terminal, an external connection terminal and a coil connection terminal are formed. A coil terminal part that is pulled out from a winding part overlapping the external connection terminal in the axial direction is connected to the coil connection terminal while being subjected to forming to be pulled out in a circumferential direction.

2 Claims, 3 Drawing Sheets

(56)             References Cited

U.S. PATENT DOCUMENTS

| | | | | | |
|---|---|---|---|---|---|
| 5,682,070 A * | 10/1997 | Adachi | H02K 19/22 | | |
| | | | 310/71 | | |
| 5,728,975 A * | 3/1998 | Tanaka | H01R 12/62 | | |
| | | | 439/115 | | |
| 6,014,007 A * | 1/2000 | Seibel | H02P 21/34 | | |
| | | | 318/807 | | |
| 6,069,428 A * | 5/2000 | Nelson | H02K 11/33 | | |
| | | | 310/90 | | |
| 6,111,328 A * | 8/2000 | Ota | H02P 25/08 | | |
| | | | 307/147 | | |
| 6,252,327 B1 * | 6/2001 | Matsuzaki | H02K 3/12 | | |
| | | | 310/201 | | |
| 6,271,608 B1 * | 8/2001 | Haydock | H02K 5/225 | | |
| | | | 310/260 | | |
| 6,464,538 B2 * | 10/2002 | Miyazaki | H01R 13/6589 | | |
| | | | 439/95 | | |
| 6,469,413 B1 * | 10/2002 | Oohashi | H02K 11/05 | | |
| | | | 310/201 | | |
| 6,475,007 B2 * | 11/2002 | Sugata | H01R 35/025 | | |
| | | | 439/164 | | |
| 6,514,100 B2 * | 2/2003 | Maegawa | H01R 12/61 | | |
| | | | 439/492 | | |
| 6,538,356 B1 * | 3/2003 | Jones | H02K 3/50 | | |
| | | | 310/422 | | |
| 6,737,773 B2 * | 5/2004 | Hayashi | F04B 27/0895 | | |
| | | | 310/71 | | |
| 6,856,057 B2 * | 2/2005 | Kobayashi | H02K 15/30 | | |
| | | | 310/71 | | |
| 6,917,174 B2 * | 7/2005 | Carruthers | G01R 15/18 | | |
| | | | 318/474 | | |
| 6,930,418 B2 * | 8/2005 | Kobayashi | H02K 3/522 | | |
| | | | 310/239 | | |
| 7,445,529 B2 * | 11/2008 | Takizawa | H01R 13/113 | | |
| | | | 439/845 | | |
| 7,936,099 B2 * | 5/2011 | Staudemann | H02K 11/33 | | |
| | | | 310/198 | | |
| 7,948,130 B2 * | 5/2011 | Kitagawa | H02K 3/522 | | |
| | | | 310/71 | | |
| 8,339,001 B2 * | 12/2012 | Ghodsi-Khameneh | | | |
| | | | H02K 3/28 | | |
| | | | 310/71 | | |
| 8,816,550 B2 * | 8/2014 | Kim | B62D 5/0403 | | |
| | | | 310/43 | | |
| 8,853,910 B2 * | 10/2014 | Sato | H02K 3/24 | | |
| | | | 310/194 | | |
| 8,922,080 B2 * | 12/2014 | Nakagawa | H01R 43/16 | | |
| | | | 310/71 | | |
| 9,866,080 B2 * | 1/2018 | Kim | F04C 23/001 | | |
| 10,186,928 B2 * | 1/2019 | Firat | H02K 11/25 | | |
| 10,476,334 B2 * | 11/2019 | Owen | H01G 4/248 | | |
| 10,749,404 B2 * | 8/2020 | Degner | H02K 3/525 | | |
| 10,790,626 B2 * | 9/2020 | Lee | H01R 25/162 | | |
| 11,025,141 B2 | 6/2021 | Kagawa | H02M 1/126 | | |
| 11,411,453 B2 * | 8/2022 | Iwano | H02K 3/50 | | |
| 11,799,344 B2 * | 10/2023 | Neet | H02K 3/28 | | |
| 11,837,927 B2 * | 12/2023 | Siddiqui | H02K 3/12 | | |
| 11,901,787 B2 * | 2/2024 | Goto | H02K 3/50 | | |
| 12,057,754 B2 * | 8/2024 | Zhang | H02K 11/22 | | |
| 2002/0084713 A1 * | 7/2002 | Kuroyanagi | H02K 3/50 | | |
| | | | 310/71 | | |
| 2003/0173842 A1 * | 9/2003 | Kobayashi | H02K 15/10 | | |
| | | | 310/71 | | |
| 2003/0178896 A1 * | 9/2003 | Crane | H02K 3/28 | | |
| | | | 310/71 | | |
| 2003/0201688 A1 * | 10/2003 | Yamamura | H02K 3/522 | | |
| | | | 310/71 | | |
| 2003/0214196 A1 * | 11/2003 | Cai | H02K 3/14 | | |
| | | | 310/208 | | |
| 2004/0135457 A1 * | 7/2004 | Holzheu | H02K 3/12 | | |
| | | | 310/201 | | |
| 2005/0023910 A1 * | 2/2005 | Lukenich | H02K 3/522 | | |
| | | | 310/179 | | |
| 2005/0189828 A1 * | 9/2005 | Nakayama | B62D 5/0403 | | |
| | | | 310/71 | | |
| 2005/0189833 A1 * | 9/2005 | Liao | H02K 3/505 | | |
| | | | 310/201 | | |
| 2005/0236921 A1 * | 10/2005 | Yoneda | H02K 3/522 | | |
| | | | 310/179 | | |
| 2005/0236922 A1 * | 10/2005 | Yoneda | H02K 3/522 | | |
| | | | 310/179 | | |
| 2005/0248228 A1 * | 11/2005 | Yoneda | H02K 3/522 | | |
| | | | 310/179 | | |
| 2005/0253466 A1 * | 11/2005 | Seguchi | H02K 3/28 | | |
| | | | 310/179 | | |
| 2006/0043806 A1 * | 3/2006 | Torii | H02K 3/522 | | |
| | | | 310/194 | | |
| 2006/0138883 A1 * | 6/2006 | Yagai | H02K 3/522 | | |
| | | | 310/179 | | |
| 2006/0202584 A1 * | 9/2006 | Jore | H02K 11/215 | | |
| | | | 310/179 | | |
| 2008/0018193 A1 * | 1/2008 | Kobayashi | H02K 5/225 | | |
| | | | 310/219 | | |
| 2009/0039720 A1 * | 2/2009 | Tsukashima | H02K 5/225 | | |
| | | | 310/71 | | |
| 2009/0072653 A1 * | 3/2009 | Harada | H02K 3/18 | | |
| | | | 29/596 | | |
| 2009/0102309 A1 * | 4/2009 | Kamibayashi | H02K 3/12 | | |
| | | | 310/195 | | |
| 2009/0102312 A1 * | 4/2009 | Tsukashima | H02K 3/522 | | |
| | | | 310/215 | | |
| 2009/0127948 A1 * | 5/2009 | Shimizu | H02K 3/50 | | |
| | | | 903/906 | | |
| 2009/0152975 A1 * | 6/2009 | Sasaki | H02K 3/522 | | |
| | | | 310/195 | | |
| 2010/0045133 A1 * | 2/2010 | Ciampolini | H02K 3/50 | | |
| | | | 310/201 | | |
| 2010/0201213 A1 * | 8/2010 | Kataoka | H02K 11/21 | | |
| | | | 310/71 | | |
| 2011/0018376 A1 * | 1/2011 | Kataoka | H02K 3/522 | | |
| | | | 310/71 | | |
| 2011/0068647 A1 * | 3/2011 | Sakaue | H02K 3/28 | | |
| | | | 310/71 | | |
| 2011/0109178 A1 * | 5/2011 | Okamoto | H02K 3/12 | | |
| | | | 310/71 | | |
| 2011/0156512 A1 * | 6/2011 | Shimomura | H02K 3/522 | | |
| | | | 310/71 | | |
| 2011/0215662 A1 * | 9/2011 | Lee | H02K 3/38 | | |
| | | | 310/71 | | |
| 2011/0278974 A1 * | 11/2011 | Matsuyama | H02K 3/52 | | |
| | | | 310/71 | | |
| 2011/0297474 A1 * | 12/2011 | Aono | B62D 5/0403 | | |
| | | | 174/68.2 | | |
| 2012/0037436 A1 * | 2/2012 | Kwon | H02K 3/50 | | |
| | | | 310/71 | | |
| 2012/0086292 A1 * | 4/2012 | Ishida | H02K 11/25 | | |
| | | | 310/71 | | |
| 2012/0126646 A1 * | 5/2012 | Nakagawa | H02K 5/225 | | |
| | | | 310/71 | | |
| 2012/0146437 A1 * | 6/2012 | Kernahan | H02P 11/06 | | |
| | | | 310/71 | | |
| 2012/0262014 A1 * | 10/2012 | Katou | H02K 3/522 | | |
| | | | 310/71 | | |
| 2012/0286593 A1 * | 11/2012 | Yokogawa | H02K 3/522 | | |
| | | | 310/43 | | |
| 2012/0319512 A1 * | 12/2012 | Nakagawa | H02K 1/278 | | |
| | | | 310/71 | | |
| 2013/0069461 A1 * | 3/2013 | Arai | H02K 3/522 | | |
| | | | 310/71 | | |
| 2013/0113313 A1 * | 5/2013 | Ikura | H02K 3/522 | | |
| | | | 310/71 | | |
| 2013/0328426 A1 * | 12/2013 | Jang | H02K 3/522 | | |
| | | | 310/71 | | |
| 2014/0014390 A1 * | 1/2014 | Chamberlin | H02K 15/32 | | |
| | | | 174/68.2 | | |
| 2014/0015359 A1 * | 1/2014 | Chamberlin | H02K 3/522 | | |
| | | | 310/71 | | |
| 2014/0113472 A1 * | 4/2014 | Chamberlin | H02K 3/50 | | |
| | | | 439/212 | | |

(56) References Cited

U.S. PATENT DOCUMENTS

| 2014/0125173 | A1* | 5/2014 | Hayashi | H02K 5/10 |
| | | | | 310/88 |
| 2014/0175921 | A1* | 6/2014 | Tomita | H02K 3/50 |
| | | | | 310/71 |
| 2014/0232215 | A1* | 8/2014 | Takasaki | H02K 11/0094 |
| | | | | 310/43 |
| 2014/0232223 | A1* | 8/2014 | Takasaki | H02K 3/28 |
| | | | | 310/71 |
| 2015/0015095 | A1* | 1/2015 | Kurono | H02K 3/50 |
| | | | | 310/54 |
| 2015/0076944 | A1* | 3/2015 | Shim | H02K 3/28 |
| | | | | 310/71 |
| 2015/0097453 | A1* | 4/2015 | Nishikawa | H02K 3/50 |
| | | | | 310/71 |
| 2015/0188377 | A1* | 7/2015 | Kim | H02K 1/278 |
| | | | | 417/415 |
| 2015/0229172 | A1* | 8/2015 | Kashihara | H02K 5/225 |
| | | | | 310/71 |
| 2015/0263580 | A1* | 9/2015 | Houzumi | B29C 45/14065 |
| | | | | 310/43 |
| 2015/0311764 | A1* | 10/2015 | Nakamura | H02K 3/522 |
| | | | | 310/71 |
| 2016/0111931 | A1* | 4/2016 | Kakuda | H02K 5/08 |
| | | | | 310/43 |
| 2016/0254717 | A1* | 9/2016 | Hoshina | H02K 3/18 |
| | | | | 310/71 |
| 2016/0301272 | A1* | 10/2016 | Haruno | H02K 1/12 |
| 2017/0093239 | A1* | 3/2017 | Teranishi | H02K 3/28 |
| 2017/0104281 | A1* | 4/2017 | Kurono | H02K 3/522 |
| 2017/0126092 | A1* | 5/2017 | Han | H02K 5/225 |
| 2017/0250585 | A1* | 8/2017 | Ohashi | H02K 15/33 |
| 2017/0366060 | A1* | 12/2017 | Haberkorn | H02K 3/522 |
| 2018/0006522 | A1* | 1/2018 | Hiramitsu | H02K 3/522 |
| 2018/0175570 | A1* | 6/2018 | Houzumi | H02K 3/50 |
| 2018/0241268 | A1* | 8/2018 | Asahi | H02K 3/28 |
| 2018/0309340 | A1* | 10/2018 | Ogawa | H02K 3/28 |
| 2018/0316238 | A1* | 11/2018 | Kong | H02K 3/522 |
| 2019/0356190 | A1* | 11/2019 | Kitta | H02K 1/148 |
| 2020/0014272 | A1* | 1/2020 | Asahi | H02K 3/50 |
| 2020/0059127 | A1* | 2/2020 | Yamashita | H02K 3/522 |
| 2021/0194310 | A1* | 6/2021 | Yoshikawa | H02K 5/225 |
| 2021/0305853 | A1* | 9/2021 | Takahashi | H02K 3/522 |
| 2021/0305870 | A1* | 9/2021 | Takahashi | H02K 5/08 |
| 2021/0359568 | A1* | 11/2021 | Goto | H02K 3/50 |
| 2022/0271597 | A1* | 8/2022 | Kamizato | H02K 3/50 |
| 2023/0101842 | A1* | 3/2023 | Okamoto | H02K 5/1672 |
| | | | | 310/66 |
| 2024/0305146 | A1* | 9/2024 | Zuo | H02K 1/148 |
| 2024/0429767 | A1* | 12/2024 | Ha | H02K 3/522 |

* cited by examiner

MOTOR WITH BUSBAR TERMINAL WITH OVERLAPPING LAYERS WITH EXTERNAL CONNECTION TERMINAL, COIL TERMINAL AND COIL TERMINAL PART

CROSS-REFERENCE TO RELATED APPLICATIONS

This application claims the priority benefit of Japan Application No. 2023-128130, filed on Aug. 4, 2023. The entirety of the above-mentioned patent application is hereby incorporated by reference herein and made a part of this specification.

BACKGROUND

Technical Field

The disclosure relates to a motor.

Related Art

Japanese Patent Laid-open No. 2021-52492 discloses a motor in which a coil wound around a stator core is linearly extended in an axial direction of the motor and electrically connected to a busbar terminal by welding.

However, in the above configuration, in a portion overlapping an external connection terminal in the axial direction of the motor, the coil is unable to be connected to the busbar terminal.

SUMMARY

One aspect of the disclosure provides a motor. The motor includes a busbar terminal including a plurality of layers overlapping in an axial direction. In the busbar terminal, an external connection terminal and a coil connection terminal are formed. A coil terminal part that is pulled out from a winding part overlapping the external connection terminal in the axial direction is connected to the coil connection terminal while being subjected to forming to be pulled out in a circumferential direction.

DESCRIPTION OF THE EMBODIMENTS

The disclosure provides a motor in which a coil terminal part can be connected to a busbar terminal regardless of a position of an external connection terminal.

According to the disclosure, the coil terminal part can be connected to the busbar terminal regardless of the position of the external connection terminal.

An embodiment of the disclosure will be described below with reference to the drawings.

Figure 1:
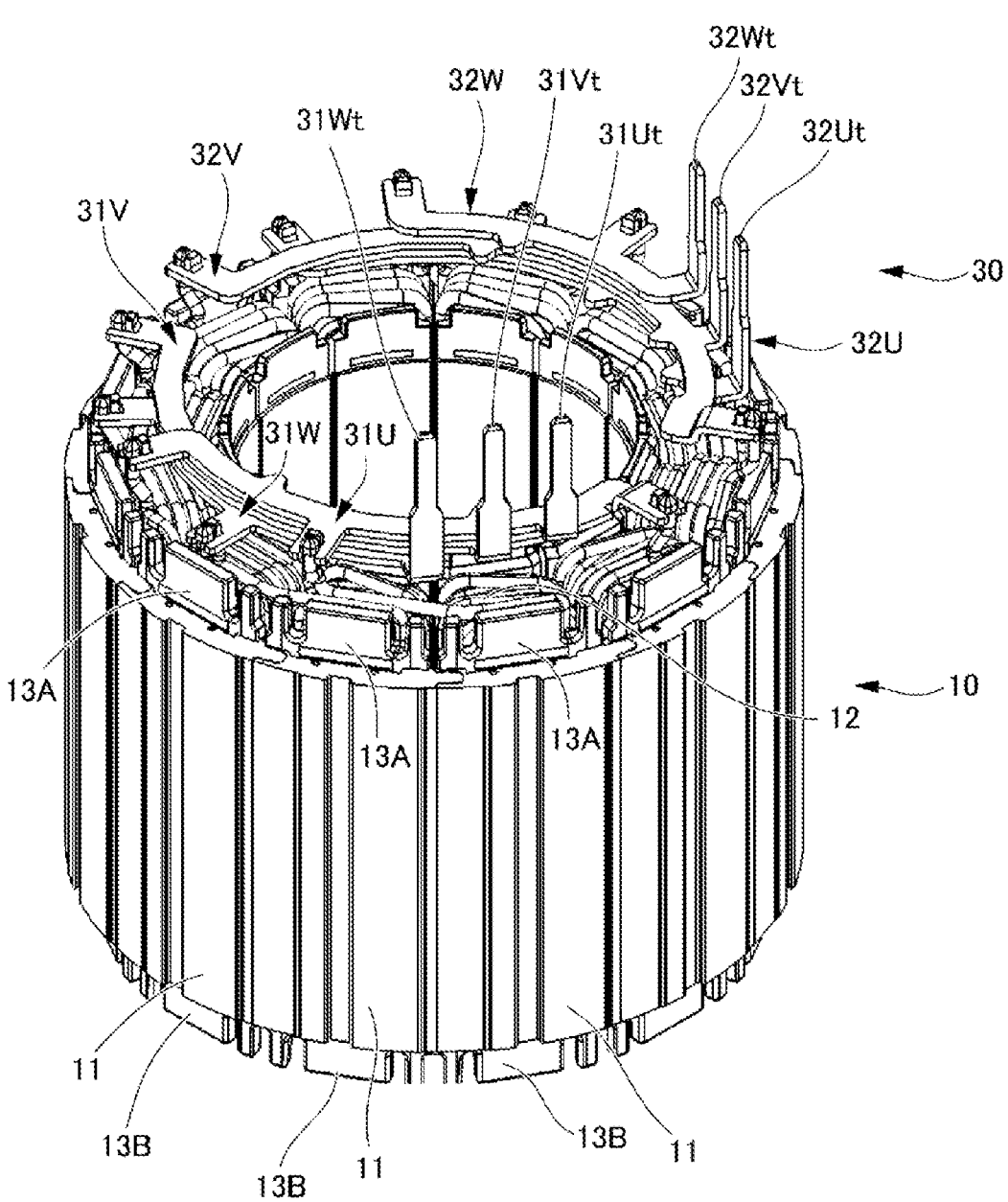
FIG. 1 is a perspective view showing a configuration of a stator unit in a motor of the present embodiment.
Figure 2:
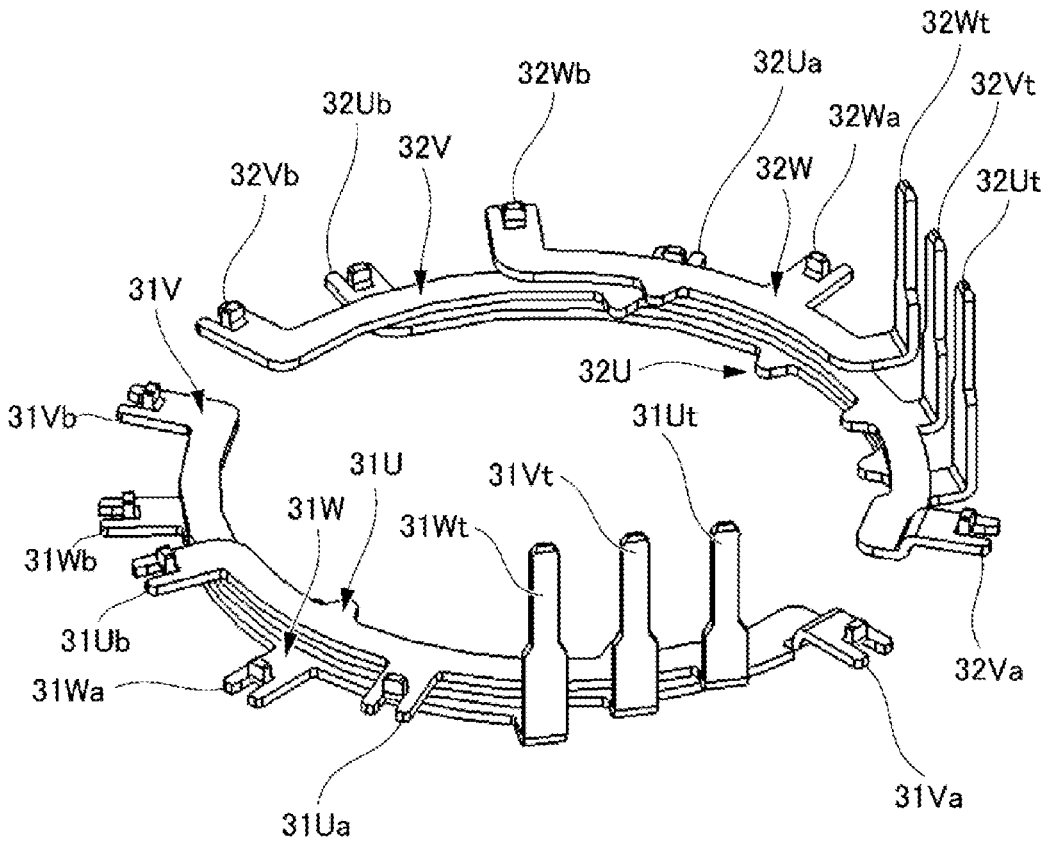
FIG. 2 is a perspective view showing a configuration of a busbar terminal provided in a busbar unit.

FIG. 1 is a perspective view showing a configuration of a stator unit in a motor of the present embodiment. FIG. 2 is a perspective view showing a configuration of a busbar terminal provided in a busbar unit.

As shown in FIG. 1, a three-phase brushless motor as a motor of the present embodiment includes: a stator unit 10, having a substantially cylindrical shape surrounding a rotor unit (not shown); and a busbar unit 30, attached to an axial end of the stator unit 10. The axial direction corresponds to a direction of a rotation axis of the motor, and the circumferential direction corresponds to a direction around the rotation axis of the motor. A configuration of a motor body (stator unit) of the present disclosure is arbitrary and is not limited to the configuration (such as number of phases, number of poles, and connection state of coil) of the motor shown in the present embodiment. While the use of the motor is arbitrary, the motor of the present embodiment can be applied to a power steering motor as an example.

As shown in FIG. 1, the stator unit 10 includes: a plurality of (12-pole in FIG. 1) stator cores 11, arranged at equal angles in the circumferential direction; a plurality of coils 12, wound around the stator cores 11; and an insulator 13A and an insulator 13B, interposed between each stator core 11 and each coil 12.

As shown in FIG. 1 and FIG. 2, the busbar unit 30 includes a busbar terminal 31U, a busbar terminal 31V, and a busbar terminal 31W which correspond to the U phase, V phase, and W phase, respectively, as well as a busbar terminal 32U, a busbar terminal 32V, and a busbar terminal 32W which correspond to the U phase, V phase, and W phase, respectively. For convenience of description, in FIG. 1, an insulating member provided in the busbar unit 30 and covering the busbar terminals 31U, 31V, 31W, 32U, 32V, and 32W is omitted from illustration.

As shown in FIG. 2, the busbar terminal 31U, the busbar terminal 31V, and the busbar terminal 31W constitute a plurality of layers overlapping in the axial direction.

Formed in the busbar terminal 31U are an external connection terminal 31Ut to which a U-phase drive voltage is applied, and two coil connection terminals 31Ua and 31Ub to each of which a coil terminal part 12A (see FIG. 3) is connected. Formed in the busbar terminal 31V are an external connection terminal 31Vt to which a V-phase drive voltage is applied, and two coil connection terminals 31Va and 31Vb to each of which the coil terminal part 12A is connected. Formed in the busbar terminal 31W are an external connection terminal 31Wt to which a W-phase drive voltage is applied, and two coil connection terminals 31Wa and 31Wb to each of which the coil terminal part 12A is connected.

As shown in FIG. 2, the busbar terminal 32U, the busbar terminal 32V, and the busbar terminal 32W constitute a plurality of layers overlapping in the axial direction.

Formed in the busbar terminal 32U are an external connection terminal 32Ut to which a U-phase drive voltage is applied, and two coil connection terminals 32Ua and 32Ub to each of which the coil terminal part 12A is connected. Formed in the busbar terminal 32V are an external connection terminal 32Vt to which a V-phase drive voltage is applied, and two coil connection terminals 32Va and 32Vb to each of which the coil terminal part 12A is connected. Formed in the busbar terminal 32W are an external connection terminal 32Wt to which a W-phase drive voltage is applied, and two coil connection terminals 32Wa and 32Wb to each of which the coil terminal part 12A is connected.

Figure 3:
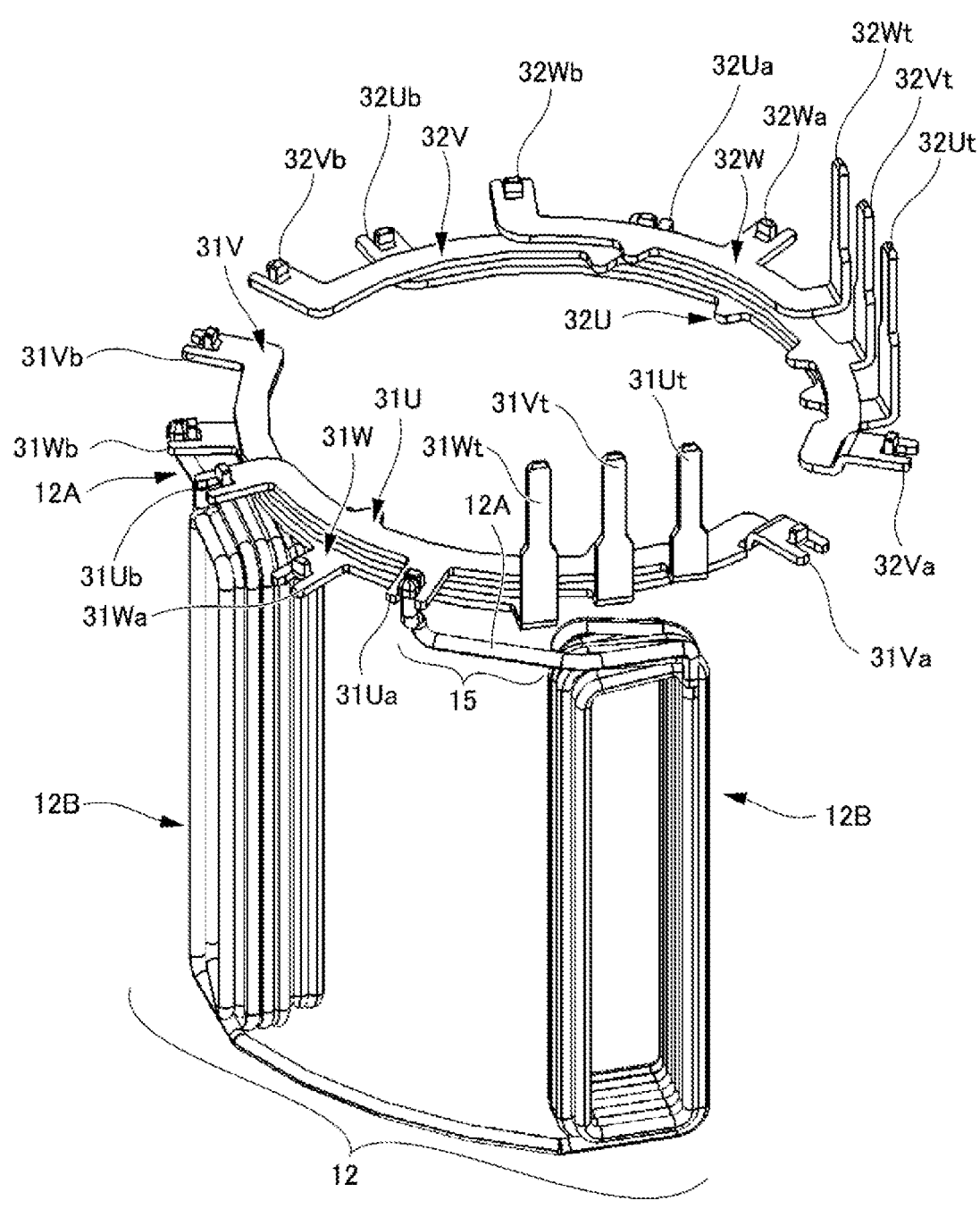
FIG. 3 is a perspective view illustrating a connection state between a coil and a busbar terminal.

FIG. 3 illustrates a connection state between a coil and a busbar terminal.

The coil 12 shown in FIG. 3 includes: two winding parts 12B, corresponding to two stator cores 11; and two coil terminal parts 12A, respectively pulled out from the two winding parts 12B and respectively connected to the busbar terminal 31U and the busbar terminal 31W. As shown in FIG. 3, the present embodiment illustrates windings at intervals of three in which two stator cores 11 (FIG. 1) are arranged between two winding parts 12B. However, in the disclosure, the winding part can be arranged in any manner, and the disclosure is not limited to the windings at intervals of three.

In FIG. 3, the coil terminal part 12A pulled out from the winding part 12B located on the right side has a portion 15 which is extended in the circumferential direction by forming. Furthermore, the coil terminal part 12A is bent in the axial direction from the portion 15 by forming, and is connected to the coil connection terminal 31Ua by welding with an insulating coating film removed from its tip.

As shown in FIG. 3, the winding part 12B located on the right side in FIG. 3 is in a position overlapping the external connection terminals 31Ut, 31Vt, and 31Wt in the axial direction, and the coil terminal part 12A extends in the circumferential direction at the portion 15. Hence, approach or interference between the coil connection terminal 31Ua and the external connection terminals 31Ut, 31Vt, and 31Wt can be avoided. Accordingly, for example, a welding torch can be inserted toward the coil connection terminal 31Ua, and the motor can be manufactured.

In contrast, if an attempt is made to connect the coil terminal part 12A linearly extending in the axial direction to the busbar terminal 31U without providing the portion 15, a connection portion between the coil terminal part 12A and the busbar terminal approaches or interferes with the external connection terminals 31Ut, 31Vt, and 31Wt. Hence, it becomes impossible to connect the coil terminal part 12A and the busbar terminal.

In the present embodiment, the coil terminal part 12A having a circumferentially extending portion (portion corresponding to the portion 15) may be connected to any of the busbar terminal 31U, the busbar terminal 31V, and the busbar terminal 31W. However, as in the example shown in FIG. 3, if the coil terminal part 12A is connected to the busbar terminal 31U that is farthest from the stator unit 10 in the axial direction, sufficient spacing can be secured between the winding part 12B and the busbar terminal 31U (coil connection terminal 31Ua) in the axial direction. Hence, forming of the coil terminal part 12A is facilitated, and workability during manufacture of the motor can be improved.

In the present embodiment, a positional relationship between the winding part 12B and the coil connection terminal 31Ua in the circumferential direction is also arbitrary. For example, the coil connection terminal 31Ua may be arranged apart from the winding part 12B in the circumferential direction by a spacing equal to or greater than an arrangement interval between adjacent stator cores 11. For example, in the example of FIG. 3, the coil connection terminal 31Ua can be provided in a position away from the winding part 12B on the right side at an angle of 30 degrees or more about an axis. In this way, by providing the coil connection terminal 31Ua in a position away from the winding part 12B in the circumferential direction, even if the winding part 12B is arranged in a position overlapping the external connection terminals 31Ut, 31Vt, and 31Wt, a sufficient distance can be secured between the external connection terminals 31Ut, 31Vt, 31Wt and the coil connection terminal 31Ua.

As described above, in the present embodiment, the coil terminal part can be connected to the busbar terminal regardless of the position of the external connection terminal.

Although the embodiment of the disclosure has been described in detail with reference to the drawings, the specific configuration is not limited thereto, and designs and the like within the scope not deviating from the gist of the disclosure are also included.

Regarding the above embodiment of the disclosure, the following supplementary notes are further disclosed.

[Supplementary Note 1]

A motor includes a busbar terminal (31U, 31V, 31W) including a plurality of layers overlapping in an axial direction. In the busbar terminal, an external connection terminal (31Ut, 31Vt, 31Wt) and a coil connection terminal (31Ua) are formed. A coil terminal part (12A) that is pulled out from a winding part (12B) overlapping the external connection terminal in the axial direction is connected to the coil connection terminal while being subjected to forming to be pulled out in a circumferential direction.

According to the configuration described in supplementary note 1, since the coil terminal part is subjected to forming to be pulled out in the circumferential direction, a distance can be secured between the external connection terminal and the coil connection terminal. Hence, the coil terminal part can be easily connected to the coil connection terminal regardless of the position of the external connection terminal.

[Supplementary Note 2]

In the motor described in supplementary note 1, the coil connection terminal to which the coil terminal part is connected is formed in the busbar terminal (31U) arranged farthest from a stator in the axial direction in the plurality of layers of the busbar terminal.

According to the configuration described in supplementary note 2, a distance between the winding part of the coil and the coil connection terminal in the axial direction can be secured. Hence, it becomes possible to easily perform forming on the coil terminal part.

[Supplementary Note 3]

In the motor described in supplementary note 1, the coil connection terminal is arranged apart from the winding part in the circumferential direction by a spacing equal to or greater than an arrangement interval between adjacent stator cores.

According to the configuration described in supplementary note 3, by providing the coil connection terminal in a position away from the winding part in the circumferential direction, a sufficient distance can be secured between the external connection terminal and the coil connection terminal.

What is claimed is:

1. A motor, comprising:
a busbar terminal, comprising a plurality of layers overlapping in an axial direction, wherein
an external connection terminal and a coil connection terminal are formed in the busbar terminal; and
a coil terminal part that is pulled out from a winding part overlapping the external connection terminal in the axial direction is connected to the coil connection terminal while being subjected to forming to be pulled out in a circumferential direction,
wherein a layer of the plurality of layers closest to the winding part is provided with another external connection terminal, and the winding part overlaps the another external connection terminal in the axial direction, and wherein the coil connection terminal to which the coil terminal part is connected is formed in the busbar terminal arranged farthest from a stator in the axial direction in the plurality of layers of the busbar terminal.

2. The motor according to claim 1, wherein the coil connection terminal is arranged apart from the winding part in the circumferential direction by a spacing equal to or greater than an arrangement interval between adjacent stator cores.

* * * * *